United States Patent [19]

Oh

[11] Patent Number: 5,375,001
[45] Date of Patent: Dec. 20, 1994

[54] METHOD OF AND APPARATUS FOR PRODUCING AREA SIGNALS IN DIGITAL IMAGE PROCESSING SYSTEM

[75] Inventor: Hyang-Su Oh, Suweon-shi, Rep. of Korea

[73] Assignee: Samsung Electronics Co., Ltd., Rep. of Korea

[21] Appl. No.: 83,338

[22] Filed: Jun. 29, 1993

[30] Foreign Application Priority Data

Jun. 30, 1992 [KR] Rep. of Korea .................... 92-11539

[51] Int. Cl.$^5$ ...................... H04N 1/387; H04N 1/40; H04N 1/46
[52] U.S. Cl. .................................... 358/518; 358/532; 358/537; 358/538; 358/452; 358/453
[58] Field of Search ............... 358/453, 452, 451, 449, 358/488, 448, 518, 519, 520, 522, 523, 528, 532, 537, 538

[56] References Cited

U.S. PATENT DOCUMENTS

| | | | |
|---|---|---|---|
| 5,079,625 | 1/1992 | Kitamura et al. | 358/537 |
| 5,115,320 | 5/1992 | Ebihara et al. | 358/453 |
| 5,124,799 | 6/1992 | Tsuboi et al. | 358/453 |

Primary Examiner—Scott A. Rogers
Attorney, Agent, or Firm—Evenson, McKeown, Edwards & Lenahan

[57] ABSTRACT

An apparatus for producing area signals in a digital video image processing system comprising memory means for storing start and end addresses of areas designated and function numbers representing the kind of editing functions of the areas designated, address generator means for generating addresses needed for accessing the memory means, buffer means for opening or closing data transferring path between the memory means and buses in accordance with the memory accessing operation effected by the address generator means and the memory accessing operation effected by a central processing unit (CPU), counter means for counting the number of video clock signals corresponding to a scanning line, address comparator means for comparating upper 8 bits of the output of the counter means and area addresses from the memory means, function number analyzer means for producing a predetermined bit number $2^n$ of data signal corresponding to the function number of a predetermined bit number (n) from the memory means, area delimitating means for delimitating the areas designated, and flip flop means toggled by the outputs of the area delimitating means for producing area signals with respect to the designated areas continously for a constant period, and a method of producing area signals in the digital video image system using the apparatus are provided.

5 Claims, 10 Drawing Sheets

FIG. 5a

| address | ∅3 | ∅(bit) |
|---|---|---|
| $8n+7$ | $x_3'$ | $n_3$ |
| $8n+6$ | $x_3$ | $n_3$ |
| $8n+5$ | $x_2'$ | $n_2$ |
| $8n+4$ | $x_2$ | $n_2$ |
| $8n+3$ | $x_1'$ | $n_1$ |
| $8n+2$ | $x_1$ | $n_1$ |
| $8n+1$ | $x_0'$ | $n_0$ |
| $8n$ | $x_0$ | $n_0$ |
|  | 1st memory | 2nd memory |

FIG. 5b

| function number ($n_i$) | function |
|---|---|
| 0 | masking |
| 1 | trimming |
| 2 | partial processing |
| 3 | sharpness processing |
| ⋮ | ⋮ |
| 15 | single color processing |

FIG. 6b

| address | 1st memory | 2nd memory |
|---|---|---|
| 471 | XX | X |
| 470 | XX | X |
| 469 | x3' | 2 |
| 468 | x3 | 2 |
| 467 | x2' | 1 |
| 466 | x1' | 0 |
| 465 | x2 | 1 |
| 8×58 =464 | x1 | 0 |

| address | 1st memory | 2nd memory |
|---|---|---|
| 1575 | XX | X |
| 1574 | XX | X |
| 1573 | XX | X |
| 1572 | XX | X |
| 1571 | x5' | 15 |
| 1570 | x5 | 15 |
| 1569 | x4' | 3 |
| 8×196 =1568 | x4 | 3 |

METHOD OF AND APPARATUS FOR PRODUCING AREA SIGNALS IN DIGITAL IMAGE PROCESSING SYSTEM

BACKGROUND OF THE INVENTION

1. Field of the Invention

The present invention relates to a method of and an apparatus for producing area signals in a digital image processing system. More particularly, the present invention relates to a method of and an apparatus for producing area signals for designating a local area of a video image required for local video image editing or color transformation in a digital color image processing system such as a digital color copier or digital color printer.

2. Description of the Prior Art

FIG. 1 shows a schematic construction of a digital color copier as a gypical example of a digital color image processing system.

As seen from FIG. 1, such a color copier is substantially divided into six main parts. That is, the copier system includes a control unit 100 functioning to control an operation of the system, a scanner 200 for reading out a color video image of a document under a control of the control unit 100, an image signal processor 300 for processing the image signal supplied from the scanner 200, an image outputting unit 400 such as a laser beam printer for outputting a copied color image, a digitizer 500 for designating an area of the image for an image editing function and a color transformation function and a control panel 600 for interaction between an user and the system.

FIG. 2 shows a block diagram of a construction of the image signal processor 300 in FIG. 1. Analog image data signals which are simultaneously supplied from CCD (charge coupled device) sensors 201 in the scanner 200 are converted into digital image data signals by means of an analog to digital converter 202 and the digital image data signals are then entered to the image signal processor 300.

The image data from the analog to digital converter 202 in the scanner 300 are temporarily stored into a color decompositing and compositing portion 301 in the image signal processor 300 which puts the image data into the amount of data on a scanning line in a main scanning direction and serves to separate B (blue) data, G (green) data and R (red) data of the image data.

A shading correcting portion 302 which receives the B, G and R data from the color decompositing and compositing portion 301 functions to correct errors resulted from a degree of ununiformity of the CCD sensor 201 and a degree of ununiformity of a lighting source, for example, a fluorescent lamp which is disposed in the scanner 200 for irradiating the document. An algebraic correcting and complementary color converting portion 303 effects an algebraic correction of the data supplied from the shading correcting portion 302 to maintain a linearity in image data process and, simultaneously, converts the B.G.R signals into Y (yellow), M (magenta) and C (cyan) signals.

A black generating portion 304 functions to generate a black (BK) signals from the three Y.M.C colors, and a color correcting portion 305 corrects the degree of density of the respective color level in conformiting with the respective filters and toner and, simultaneously, outputs only the density signals of the color (one of the Y.M.C, BK color) which is developing by the image outputting portion 400.

A color transformation portion 306 performs a data processing function, that is a designated color transformation, a painting process, a trimming process or a masking process, which is selected through the control panel 600. A density processing portion 307 converts the image data supplied from the color transformation portion 306 on the basis of information (a copying density, a color balance and etc) provided from the control panel 600. A magnification and movement processing portion 308 effects an image magnification changing process and movement process in the main scanning direction by changing the input or output timing of the image data. A sharpness processing portion 309 allows to obtain an image corresponding to the value of a sharpness, mode designated through the control panel 600.

A document position recognizable portion 310 detects the position of the document located on a document stand and an area signal producing portion 311, which underlies the present invention, produces an image signal corresponding to the area designated by the digitizer 500 and supplies the image signal to the black generating portion 304, the color correcting portion 305, the color changeable portion 306 and the density processing portion 307.

FIG. 3 shows a conventional image signal producing circuit which is disclosed in Japanese laid-open patent publication No. sho 63-12055. Now, the circuit will be described in detail with reference to FIG. 3b showing a memory map and image signal generating timing chart in a conventional art.

Assuming that area signals AREAO to AREAn are generated, in a case of the area signal AREAO bits "0" of addresses X1 and X3 a RAM are written with "1" while all of bits "0" of the remaining address are to be "0". In a case of the area signal AREAn, bits "n" of addresses 1, X1, X2, X4 are written with 1 while all of bits "0" of the remaining addresses are to be "0".

As data are sequentially read out from memory devices in synchronizing with a constant clock signal which is generated on the basis of a horizontal synchronizing signal HSYNC, the data "1" can be read out at addresses X1 and X3 and then entered to both input ends J and K of the respective flip flops 148-0 to 148-n shown in FIG. 3a so as to toggle the output of the flip flops 148-0 to 148-n.

In FIG. 3a memory devices, such as RAMs generally designated 136 and 137, respectively which rapidly change the area signals. While the area signal data of the presently processing line is read out from the A memory 136, the B memory 137 is subjected to write the area data of subsequent line. The memory writing and reading operations are alternatively carried out to the A memory 136 and the B memory 137.

More specifically, when the states of control signals applied to control ports C3, C4 and C5 are to be 0, 1 and 0, the output of a counter 141 which is synchronized with the video (or image) clock $V_{CLK}$ is entered through a selector 139 to the A memory 136 as an address Aa. Accordingly, a gate 142 is opened while a gate 144 is closed, and n-bit data are supplied from the A memory 136 to the flip flops 148-0 to 148-n which produce area signals AREA0 to AREAn. At that time, a data write operation to the memory B 137 is simultaneously effected. That is, the data input through a data bus D-bus is written at an area of the B memory 137, which is designated by an address supplied through an address bus A-bus in accordance with a memory access signals R/W.

On the contrary, to generate a section signal from the data stored in the memory B 137 the control signals from the control ports C3, C4 and C5 are to be 1, 0 and 1 and the A memory 146 is subjected to the data writing operation while the B memory 137 is operated under the data reading operation.

According to such a conventional art (referred to FIG. 3) previously described, memory map is prepared by a central processing unit (CPU) which is constructed in the control unit 100 of FIG. 1 in accordance with the output of the digitizer 500 for designating a desired image area. Under this state, when an address of a sub-scanning direction corresponding to the memory map is input, the data related to the scanning line of the sub-scanning direction is written to the memory and the area signals AREA0 to AREAn are produced on the basis of the data stored in the memory.

With such a conventional construction, two memory elements which are changed on the basis of the horizontal synchronizing signal HSYNC are essentially employed so as to the area signals. That is, one of the memory elements serves to produce an area signal while the other serves to store data of next line under the central processing unit. The memory elements are alternatively subjected to an area signal output or data store.

In the conventional construction described above, the memory elements must be accessed through the address bus and the data bus by the central processing unit as the horizontal synchronizing signal is produced, so the operating speed of the system is likely to be decreased. Further, a separative memory is needed for storing and retaining data to be written into the two memory elements.

SUMMARY OF THE INVENTION

Accordingly, an object of the present invention is to provide a method of and an apparatus for producing area signals in a digital image processing system, capable of improving a system operationability and stability.

Another object of the present invention is to provide a method of and an apparatus for producing area signals in a digital image processing system, wherein an arbitrary area of a document can be taken by an user to completely assist a document image editing an color transformation if needed.

Further another object of the present invention is to provide a method of and an apparatus for producing area signals in a digital image processing system, wherein a designated area signal can be produced to delimit an area arbitrarily designated for such an image editing and color transformation.

Still another object of the present invention is to provide a method of and an apparatus for producing area signals in a digital image processing system, wherein an image edition such as a masking, trimming and partial processing can be effected to obtain a desired output image at an any timing in processing an image signal in a digital color image processing system.

In order to achieve the aforementioned objects, according to the present invention there is provided a system comprising memory means for storing start and end addresses of areas designated and function numbers representing the kind of editing functions of the areas designated, address generator means for generating addresses needed for accessing the memory means, buffer means for opening or closing data transferring path between the memory means and buses in accordance with the memory accessing operation effected by the address generator means and the memory accessing operation effected by a central processing unit (CPU), counter means for counting the number of video clock signals corresponding to a scanning line, address comparator means for comparing upper 8 bits of the output of the counter means and area addresses from the memory means, function number analyzer means for producing a predetermined bit number $2^n$ of data signal corresponding to the function number of a predetermined bit number (n) from the memory means, area delimitating means for delimitating the areas designated, and flip flop means toggled by the outputs of the area delimitating means for producing area signals with respect to the designated areas continuously for a constant period.

The above and other objects and advantages of the invention will be apparent from the following description taken with reference to the accompanying drawings.

BRIEF DESCRIPTION OF THE DRAWINGS

FIG. 5a is a view illustrating a memory map according to the present invention;

FIG. 5b is an examplary table illustrating designation of area processing function number;

FIG. 6b is a view illustrating a memory map of the area designated in FIG. 6a;

DETAILED DESCRIPTION OF THE INVENTION

Thereinafter, an preferred embodiment of the present invention will be described in detail.

Figure 4:
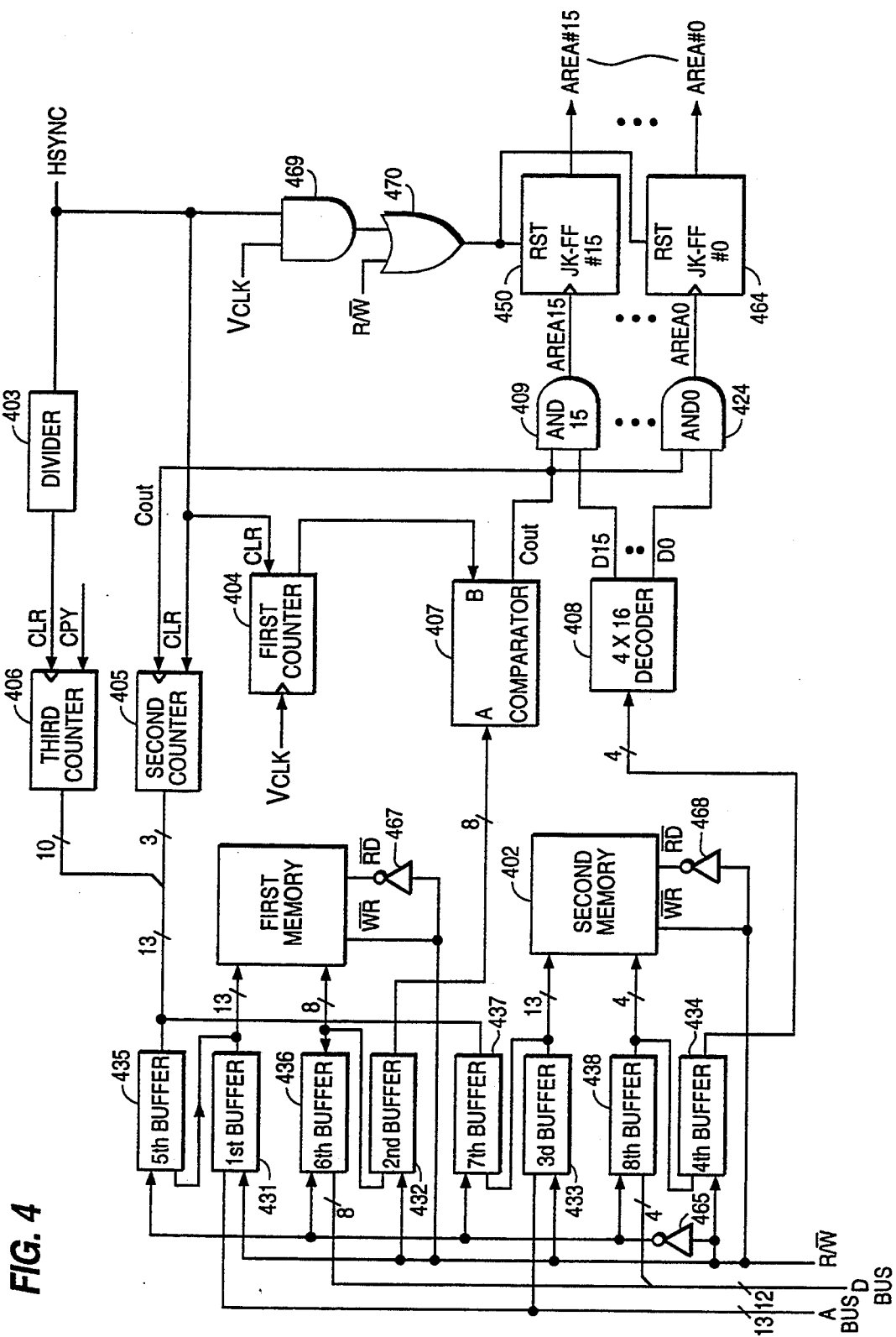
FIG. 4 is a view showing a preferred embodiment according to the present invention.

FIG. 4 shows a preferred embodiment of an area signal producing circuit according to the present invention. In the drawing, 401 denotes a first memory in which start and end addresses of areas designated are stored and 402 denotes a second memory in which function numbers of the designated areas are stored. 403 denotes a divider which divides horizontal synchronizing signals by 1/16 and 404 denotes a first counter which is synchronized with video clock signals $V_{CLK}$ and outputs data signal of 13 bits.

A second counter, generally denoted 405, produces lower 3-bit address data of the 13-bit address data, necessary for memory reference with respect to the first and second memories 401 and 402. A third counter, generally designated 406, is synchronized with the output of the divider 403 and produces upper 10-bit address data of the 13-bit address data necessary for memory reference with respect to the first and second memories 401 and 402. 407 denotes a comparator which compares the 8-bit address data from the first memory 401 and the upper 8-bit data of the first counter 404.

Furthermore, a decoder, generally designated 408, encodes 40 bit designated number data from the second memory 402 into 16-bit data format and AND gate circuits, generally designated 409 through 424, logically products 1-bit of 16-bit output of the decoder 408 and the output of the comparator 407, respectively.

In the drawing, 431 to 438 denote a first to eighth buffers which open or close data transferring paths in accordance with a memory reference signal R/W', respectively and 450 to 464 denote J-K flip flops each of which is synchronized with the corresponding output of the sixteen AND gate circuits 409 to 424, produce area signals #0 to #15. These J-K flip flops 450 to 464 can be resetted by the output of the AND gate which logically products the horizontal signals and the $V_{CLK}$ signal or the memory reference signal R/W.

Now, the operation and effect of the present invention thus constructed will be described.

Figure 1:
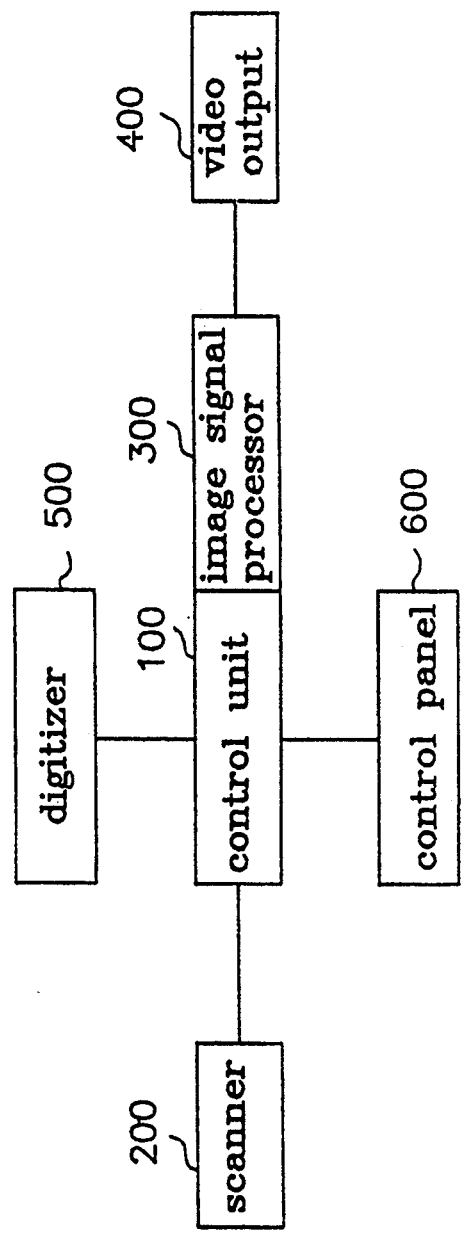
FIG. 1 is a block diagram schematically showing a construction of conventional video processing system.
Figure 2:
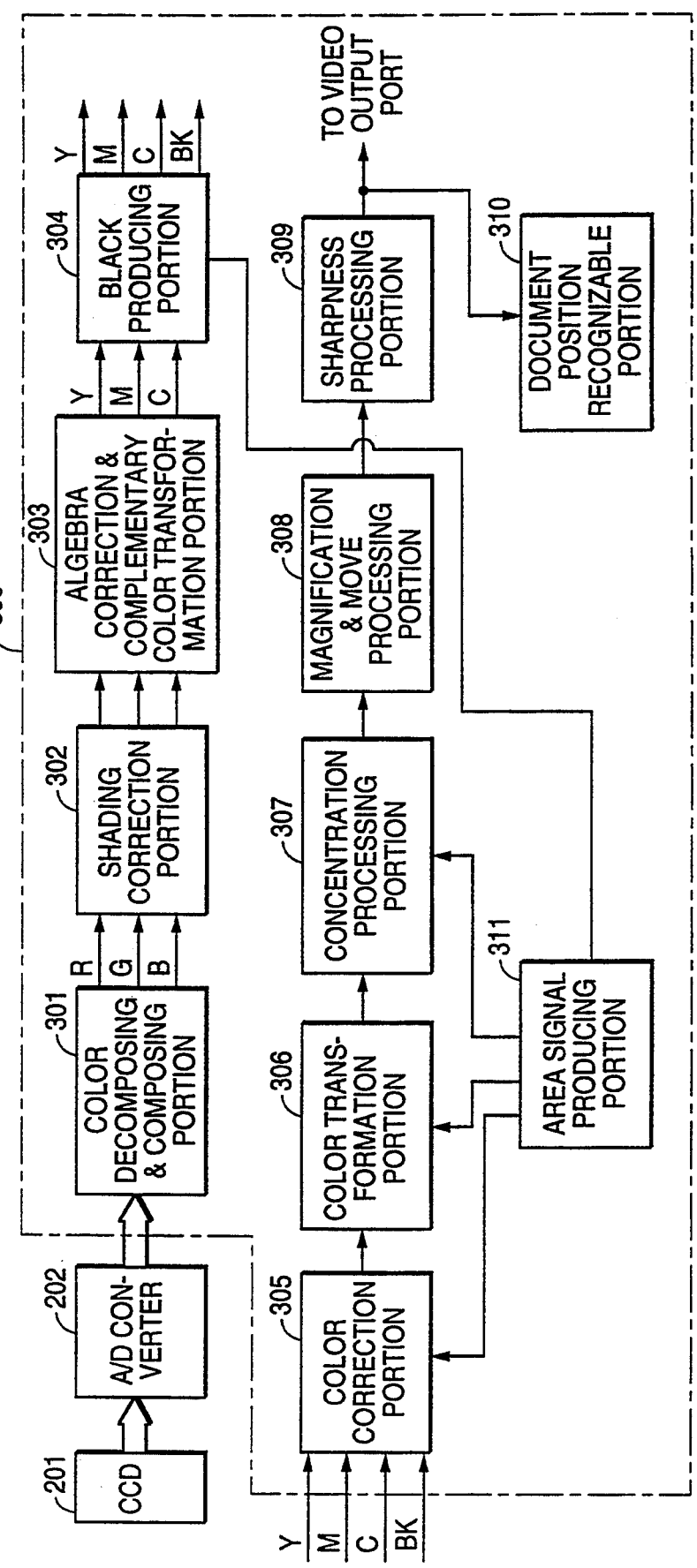
FIG. 2 is block diagram showing a video signal processor shown in FIG. 1.
Figure 3A:
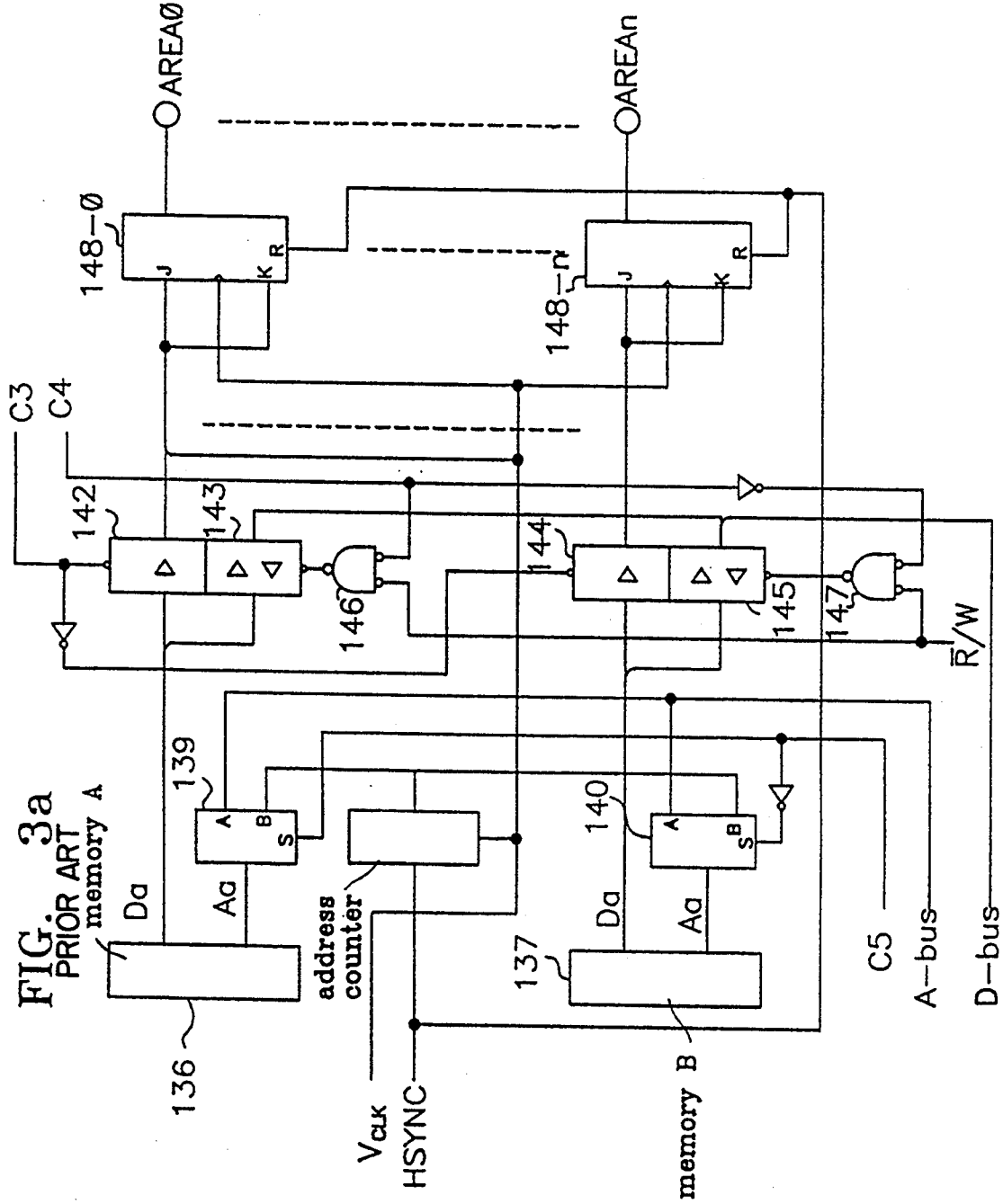
FIG. 3a is a detailed circuit diagram of a conventional area producing unit.
Figure 3B:
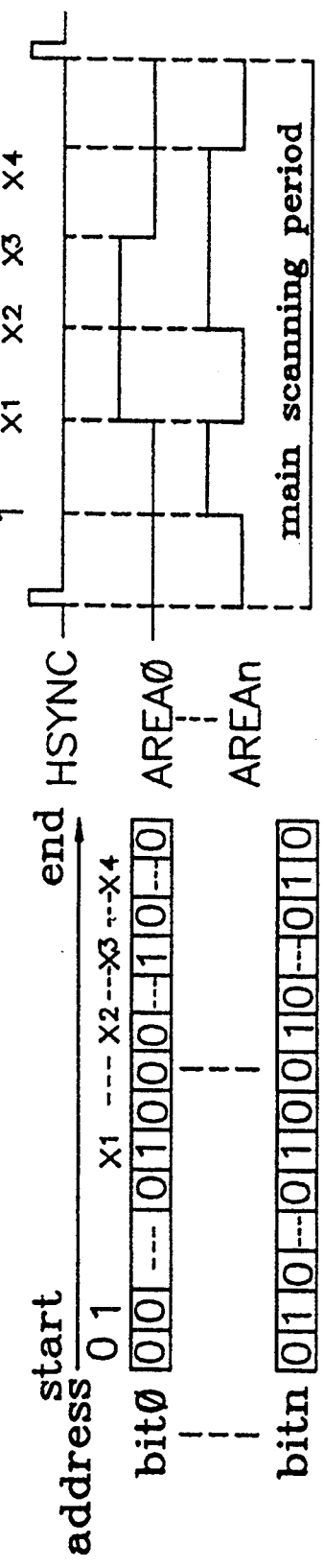
FIG. 3b is a view illustrating a memory map according to the conventional system.

As shown in FIG. 1, when area designating coordinate data for a video editing and color transformation function is provided from the digitizer 500, the central processing unit in the control unit 100 transforms data relative to a X (main scanning direction) coordinate and a y (sub-scanning direction) coordinate to video data address to be stored. At this time, the CPU stores the address together with function numbers of the designated area, that is, number data such as, 0 (masking), 1 (trimming), 2 (partial processing), 3 (sharpness processing) . . . 15 (single color processing) as shown in FIG. 5b.

In accordance with the present invention, video areas can be designated to the maximum eight points per 1 mm size of the given video (the maximum four areas can be designated because) one area is defined by a start point (or, start address) and the end point (or, end address).

For this reason, memory is allocated so as to store four pairs of the start and end addresses (see FIG. 5a). Because eight address (8 bits) per a line must be stored in the first memory 401, this is designed to be a size of at least $8 \times 8$ bits$\times 420$ lines, that is, $8 \times 420$ bytes. Alternatively, the second memory 402 which stores the function numbers corresponding to the area address must take at least $8 \times 4$ bits$\times 420$ lines, that $4 \times 420$ bytes because each of the function numbers has 4 bit n size (due to 16 kinds of the function numbers).

Figure 6A:
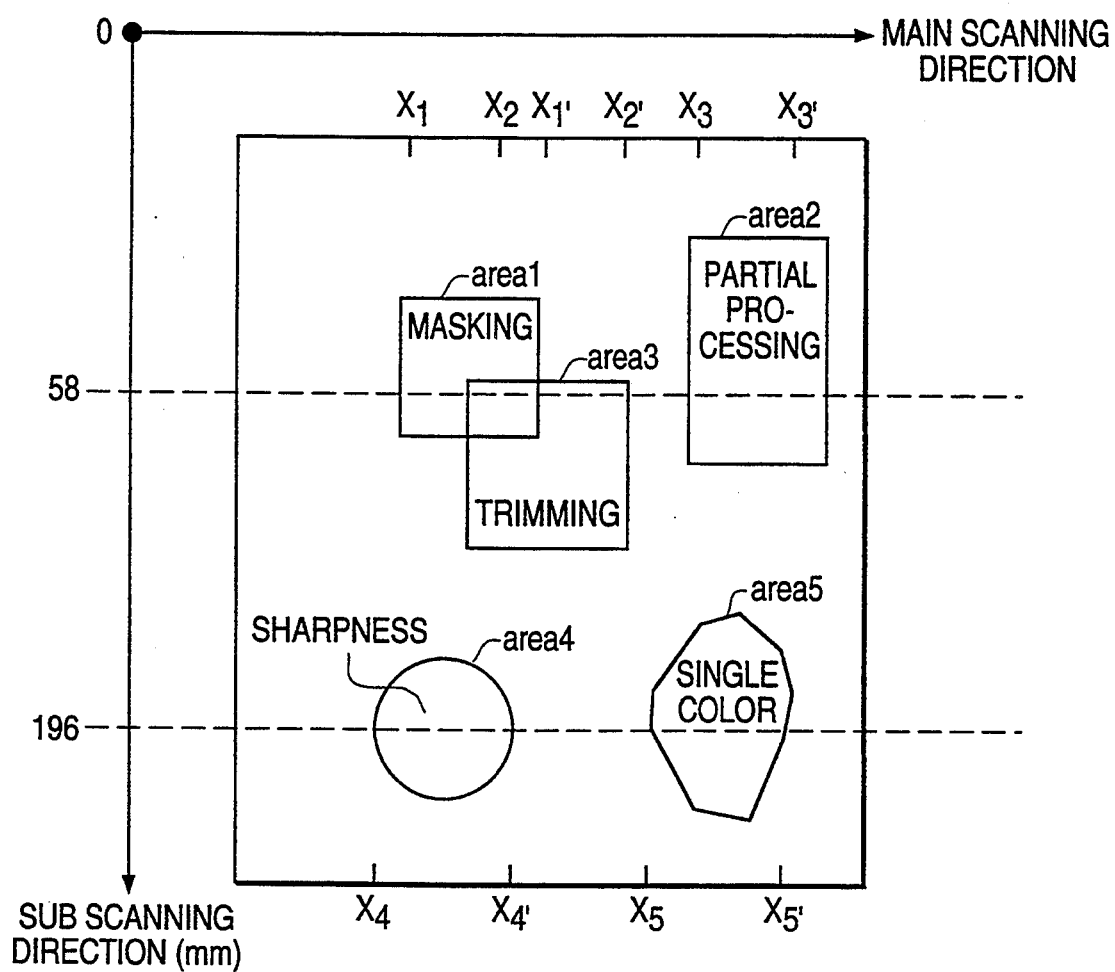
FIG. 6a is an examplary view of an area designated for explaining the present invention.
Figure 6C:
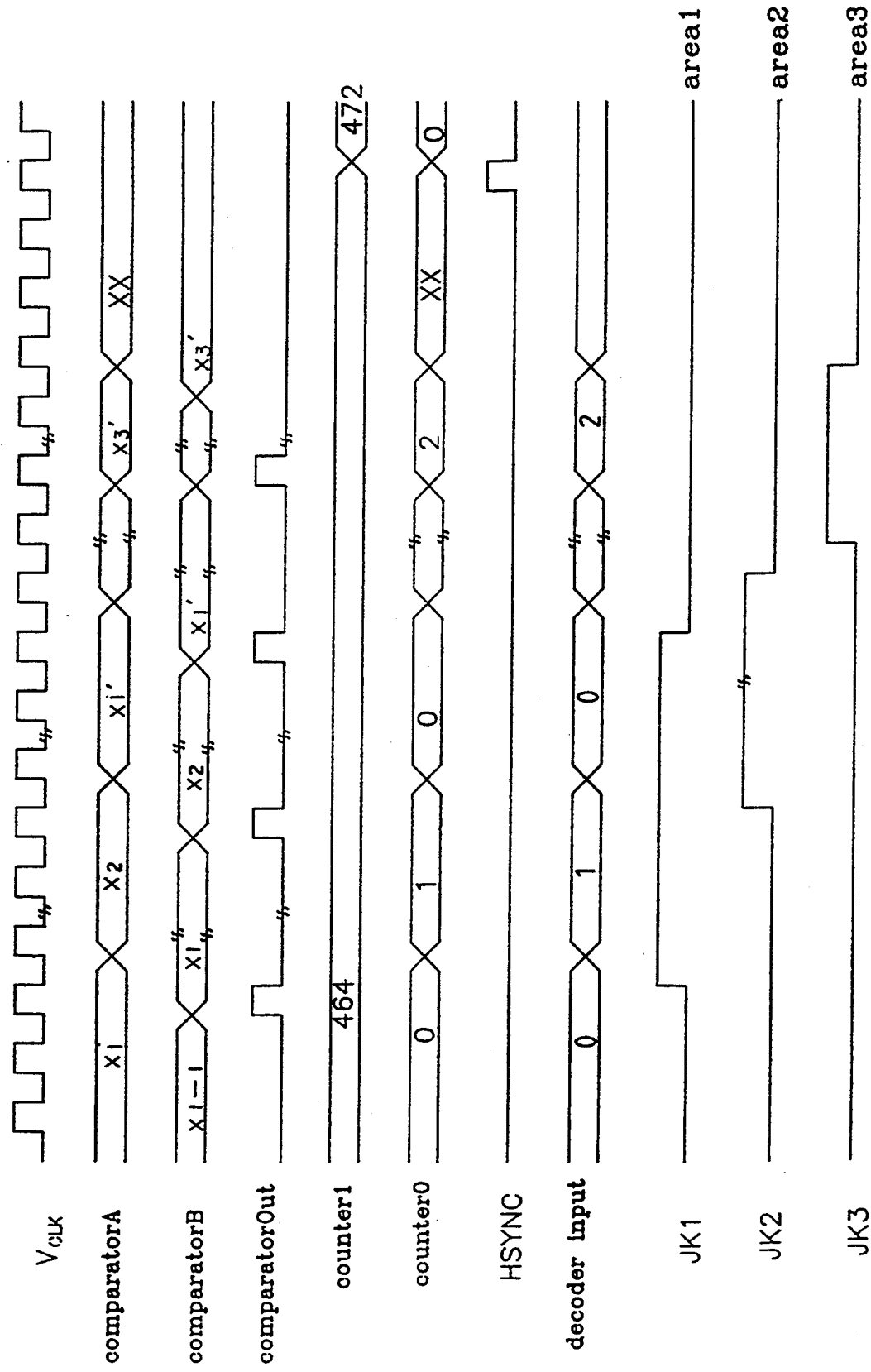
FIG. 6c is a timing chart for explaining the embodiment of the present invention; and, FIG. 7 is a flowchart explaining the present invention.

FIG. 6a shows an example of areas designated by the digitizer 500 with functions of the respective areas being designated. More particularly, area 1 is designated with the masking process function and the area 2 is designated with the partial processing function. Also, the area 3 is related to the trimming process, an area 4 is related to a sharpness process and an area 5 is related to a single color processing function.

In accordance with the areas and functions, therefore, a method of forming a memory map of the respective areas is illustrated with respect to FIG. 6b which illustrates an example of a construction of the memory map with respect to a 58 mm point and 196 mm point of the sub-scanning direction as shown in FIG. 6a for simplicity of the description.

The address of the memory is allocated by 8 bytes in a unit of mm in the sub-scanning direction (four areas can be designated within a size of 1 mm and each of the areas has eight address of the start end addresses each of which has 8 bits, $8 \times 8$ bits$=8$ bits). Accordingly, the start addresses of memory areas which is allocated for points of 0.1 mm, 2 mm, . . . , 420 mm in the sub-scanning direction become 0.8 ($=1 \times 8$), 16 ($=2 \times 8$), . . . , 3360 ($=8 \times 420$), so the start address of the memory for storing data relative to becomes 464 ($=58 \times 8$) at the 58 mm points, while the address of for storing data respective to the points of 196 mm becomes 1568 ($=196 \times 8$).

Meanwhile, as known from FIG. 6a, a boundary of each of the areas in the main scanning direction is defined such that the area 1 is (X1, X1'), the area 2 is (X2, X2'), the area 3 is (X3, X3'), the area 4 is (X4, X4'), the area 5 is (X5, X5').

Figure 7:
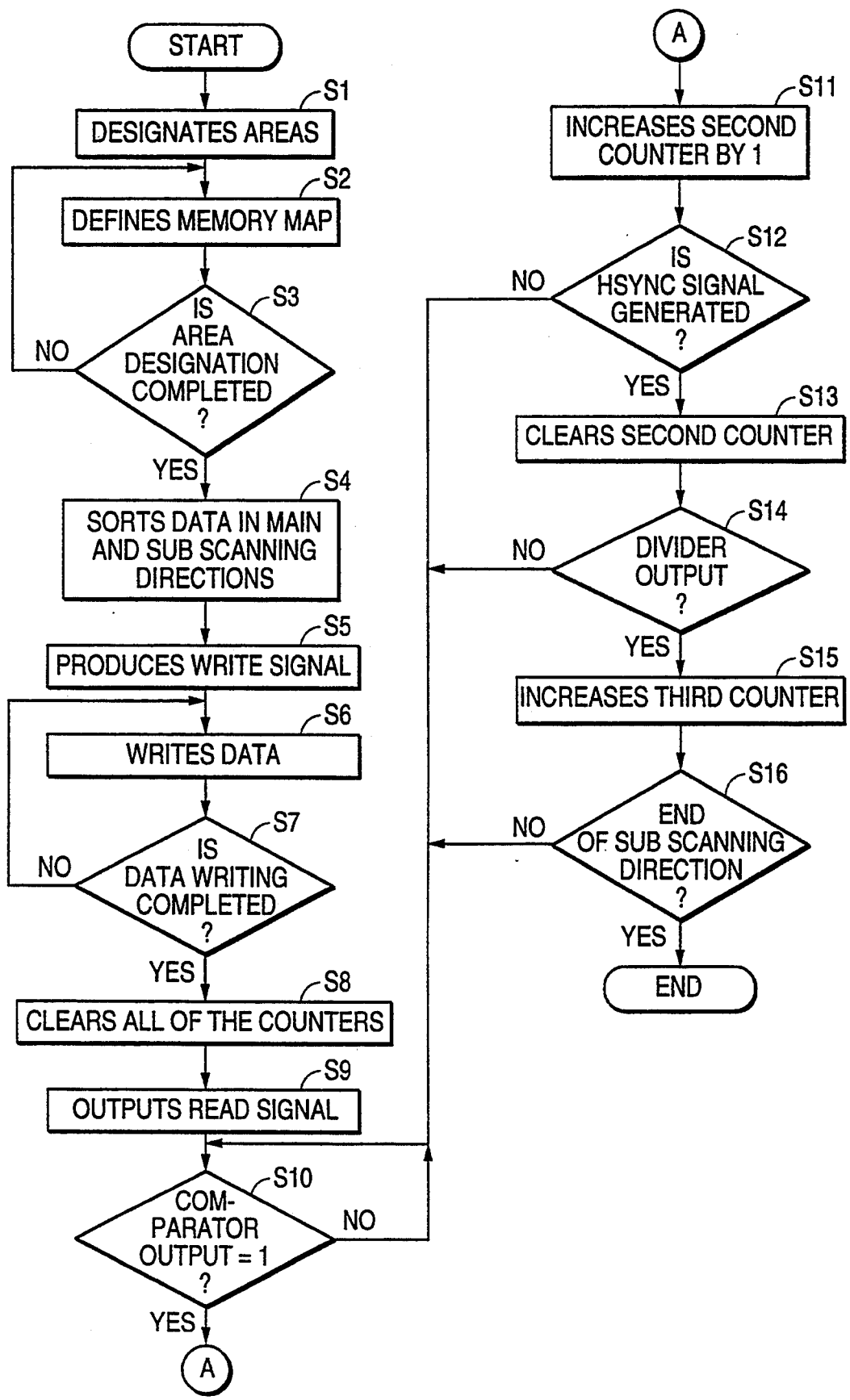

Now the descripting will be made with respect to FIG. 7 showing an operation flowchart according to the present invention.

First, an area is designated by the digitizer 500 (S1) and the X- and Y-coordinate data for the area are read-out and memory map is formed by the CPU of the control unit 100 with use of the area function numbers (S2). Consequently, the CPU determines that the designation of the area has been completed. As a result, if the designation of the area is continued (that is, No at a step S3), then the memory map of the coordinate data and the area function number is defined. Alternatively, if the designation of the area is completed Yes at the step S3), then the X-coordinate data and the Y-coordinate data are sorted in a ascending order from larger values), at a step S4. Next, the CPU outputs a write signal of a low level at a step S5 so that the data is written into the first memory 401 and the second memory 402 in FIG. 4, at a step S6. At this time, the memory reference address is passed through A-bus while the data is passed through D-bus to the entered to the memories 401 and 402 from the CPU.

Then, the writting operation has been completed at a step S7, the CPU control the first to third counters 404, 405 and 407 to be cleared at a step S8. Thereinafter, the CPU outputs a read signal of a high level at step S9.

In accordance with the read signal from the CPU, the first to fourth buffers 431, 432, 433 and 434 are closed while the fifth to eighth buffers 435, 436, 437 and 438 are opened, so that the outputs of the second counter 405 and third counter 406 are supplied to the first and second memories 401 and 402 as the memory reference address, respectively.

Now, the operations of the steps S4 to S8 will be summarized with reference to FIG. 6a.

First, if the data of the main scanning direction at a point of 58 mm in the sub-scanning direction is sorted in a ascending order, that is, X1, X2, X3, X1', X2', X3', the memory map is defined such that X1 of 8 bits is written at the 464 address of the first memory 401 and the function number with respect to the area, namely, 0 (masking) of 4 bits is written the 464 address of the second memory 402. Simultaneously, the X2 is written at the 464 address of the first memory 401 and the function number 1 representing the trimming is written at the 465 address of the second memory 402. This process is repeatedly effected with respect to the remaining data.

Meanwhile, referring to a point of 196 mm in the sub-scanning direction, X4 and 4 are written at the 1568 address of the first and second memories 401 and 402, respectively and X'4 and 3 are written at the 1569 address of the memories 401 and 402. Also, X5 and 15 are written at the 1570 address of the memories 401 and 402 and X'5 and 15 are written at the 1571 address of the first and second memories 401 and 402, respectively. Accordingly, the reading operation is completed.

Referring to FIG. 4, the first counter 103 is composed of a 13-bit counter having a clock input supplied with the video clock $V_{CLK}$. The upper 8 bit outputs of the counter 103 are supplied to the input B of the comparator 407.

During the reading operation, data stored at the 0 address of the first memory 401 is supplied to the input A of the comparator 407. Accordingly, if the inputs A and B are same, then the comparator 407 outputs a high level signal (at a step S10) which serves as a clock signals to be supplied to the second counter 405 to increase the output (i.e., address) of the second counter 405 by 1, at a step S11. As a result, contents stored at the 1 address of the first memory are supplied to the input A of the comparator 407.

While, a 1 line scan is completed in the video output unit (refer to 400 in FIG. 1) such as a laser beam printer, the synchronizing signal (i.e., HSYNC signal) is generated so as to scan subsequent lines. When the HSYNC signal is generated at a step S12, then the second counter 405 is cleared at a step S13. Alternatively, if the HSYNC signal is not provided, the output of the second counter 405 is increased by 1 in accordance with high level outputs of the comparator 407 at a step S11. Once sixteenth HSYNC signal is generated, the output of the divider 403 becomes a high level and the output of the third counter 406 is thus increased by 1 at steps S14 and S15. The increase in output of the third counter 406 means that a memory address at an area increased by 1 in the sub-scanning direction is increased. This means that when resolution of the video output unit 400 is set to 400 dpi (dot per inch), sixteen lines are present within an area of 1 mm in the sub-scanning direction and spaces between the lines are equal to each other.

When the aforementioned operation is repeatedly carried out over a length of 420 mm, the determination is made the completion of designation in areas with respect to a A3 document and the operation is completed, at a step S16.

As described above, the outputs of the second counter 405 and the third counter 406 are employed as memory reference addresses and, hence, the start and end address data of the designated areas stored in the first memory 401 and the area function number data stored in the second memory 402 are outputted effectively.

According to the present invention, the area function numbers are sized by 4 bits and the sixteen kinds of functions (i.e., $2^4$) can be designated, which are supplied to the decoder 408 to thereby obtain outputs D0 to D15 of the decoder 408.

The outputs D0 to D15 of the decoder 408 are entered to the AND gates 409 to 424 which logically ANDs them with the output Cout of the comparator 407, respectively. The outputs of the AND gate 409 to 424 are supplied as clock signal to the J-K flip flops 450 to 464 which output the area signals #0 to #15, respectively. Herein, the terminals J and K of the J-K flip flops 450 to 464 which are synchronized by the outputs of the AND gate 409 to 424 are supplied with high level signals (not shown in the drawing).

Accordingly, when the outputs of the AND gates 409 to 424 becomes a high level, the outputs of the J-K flip flops 450 to 464 are toggled in synchronizing with the clock signal. The J-K flip flops are resetted at the time of the completion of data writing to the memories. The flip flops may be resetted by a signal obtained by logic-ANDing of the HSYNC signal and the $V_{CLK}$ signal.

As noted, according to the present invention, since the areas can be arbitrarily or repetitively designated as well as several areas can be simultaneously designated, desired video editing and color transformation can be freely effected, thereby obtaining an excellent image quality. In addition, since the video can be output without accessing the area designation memory by the CPU, a load of the CPU can be reduced and the reverse memory is not employed in the system, thereby achieving a stale operation of the system.

Furthermore, a large quantity of area signals can be obtained by using a small-capacity memory, a cost of fabricating the system can be saved. Also, since the video data is written in the memory just before being outputted the data, and, then, the memory access operation is completed, the data to be written in the area generating memory is not separately retained and, therefore, the memory in the system can be effectively and economically used.

What is claimed is:

1. An apparatus for producing area signals necessary for a local video image editing or color transformation in a digital video signal processing system comprising:

memory means for storing start and end addresses of designated areas of a video image and for storing a predetermined number of bits (n) of function numbers of said designated areas representing editing functions for the designated areas, buffer means for opening or closing data transferring paths between the memory means in accordance with a memory accessing operation effected by an address generator means and another memory accessing operation effected by a central processing unit (CPU), counter means for counting a number of video clock signals corresponding to a scan line, address comparator means for comparing an upper 8 bits of an output of the counter means and area addresses from the memory means and producing identity between the addresses and the upper output bits, address generator means for generating addresses needed for accessing said memory means on the basis of horizontal synchronizing signal (HSYNC) and outputs of said comparator, function number analyzer means for producing a predetermined bit number $2^n$ of a data signal corresponding to the function number of the predetermined bit number (n) from said memory means, area delimitating means for generating area dilimiting signals delimitating the areas designated, and flip flop means toggled by outputs of the area delimitating means for producing area signals with respect to the designated areas continuously for a constant period.

2. An apparatus for producing area signals in a digital video signal processing system claim 1, further comprising reset means for resetting said flip flop means in accordance with said memory reference signal and said HSYNC signal.

3. An apparatus for producing area signals in a digital video signal processing system claim 1, wherein said counter means includes two counters for designating address data of a sub-scanning direction and address data of a main scanning direction.

4. A method for producing area signals in a digital video signal processing system having a first memory for storing area addresses; a second memory for storing area function numbers; a divider for dividing a horizontal synchronizing signal (HSYNC signal) by 1/16; a first counter synchronized with a video clock for producing a data signal of 13 bits; a second counter for producing lower 3-bit address data of 13-bit address data necessary for memory reference; a third counter synchronized with an output of said divider for producing upper 10-bit address data of said 13-bit address data necessary for memory reference; and, a comparator for comparating an output of said first counter and an output of said first memory, comprising the steps of:

designating areas of a video image by way of a digitizer;

defining a memory map by using area coordinate data and area function numbers;

checking the completion of designating said areas wherein said memory map is continuously defined in a case that the designation of areas is not completed while said coordinate data is sorted in an ascending order in a case that the designation of areas is completed;

outputting a write signal;

determining the completion of a writing operation and clearing said first to third counters when a writing operation is completed;

outputting a memory read signal;

increasing an output of said second counter by 1 when an output of said comparator is in a high level;

determining generation of said HSYNC signal wherein said second counter is cleared when said HSYNC signal is produced and determining an output of said comparator is to be a high level when the HSYNC is not produced; increasing an output of said third counter by 1 when an output of said divider is in a high level and, otherwise, checking that the output of said comparator is in a high level; and completing operation when the end in the sub-scanning direction is found and determining that the output of said comparator is in a high level when an end in a sub-scanning direction is not found.

5. A method for producing area signals in a digital video signal processing system according to claim 4, wherein at the step of defining a memory map, operation function numbers are allocated to area start address and area end address.

* * * * *